United States Patent
Onggosanusi et al.

(10) Patent No.: US 8,971,448 B2
(45) Date of Patent: Mar. 3, 2015

(54) LAYER MAPPING FOR UP LINK SINGLE USER MULTIPLE INPUT MULTIPLE OUTPUT WIRELESS TELEPHONY

(75) Inventors: Eko N. Onggosanusi, Allen, TX (US); Zukang Shen, Richardson, TX (US); Runhua Chen, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 555 days.

(21) Appl. No.: 12/693,028

(22) Filed: Jan. 25, 2010

(65) Prior Publication Data

US 2010/0215109 A1 Aug. 26, 2010

Related U.S. Application Data

(60) Provisional application No. 61/146,834, filed on Jan. 23, 2009.

(51) Int. Cl.
*H04L 27/00* (2006.01)
*H04L 1/06* (2006.01)
*H04L 1/18* (2006.01)
*H04L 1/00* (2006.01)

(52) U.S. Cl.
CPC .............. *H04L 1/06* (2013.01); *H04L 1/1893* (2013.01); *H04L 1/0003* (2013.01); *H04L 1/0009* (2013.01)

USPC ........... 375/299; 375/240; 375/267; 375/285; 375/264; 375/295

(58) Field of Classification Search
USPC .................. 375/299, 240, 267, 285, 264, 295
See application file for complete search history.

(56) References Cited

U.S. PATENT DOCUMENTS

| | | | |
|---|---|---|---|
| 2008/0080641 A1* | 4/2008 | Kim .............................. | 375/299 |
| 2010/0039928 A1* | 2/2010 | Noh et al. ...................... | 370/210 |
| 2010/0183057 A1* | 7/2010 | Lee et al. ........................ | 375/219 |
| 2010/0195594 A1* | 8/2010 | Seo et al. ........................ | 370/329 |
| 2010/0284484 A1* | 11/2010 | Jongren et al. ................ | 375/267 |

* cited by examiner

*Primary Examiner* — Zewdu Kassa
(74) *Attorney, Agent, or Firm* — Ronald O. Neerings; Frederick J. Telecky, Jr.

(57) ABSTRACT

This invention is a method and an apparatus to up link transmission of data from a user equipment to a base station for single user multiple input, multiple output. This invention includes receiving at least one codeword, permuting the received codewords, precoding the permuted codewords and transmitting the predecoded codewords on plural antennas. The codewords may be permuted by layer permutation or by codeword permutation.

12 Claims, 4 Drawing Sheets

LAYER MAPPING FOR UP LINK SINGLE USER MULTIPLE INPUT MULTIPLE OUTPUT WIRELESS TELEPHONY

CLAIM OF PRIORITY

This application claims priority under 35 U.S.C. 119(e)(1) to U.S. Provisional Application No. 61/146,834 filed Jan. 23, 2009.

TECHNICAL FIELD OF THE INVENTION

The technical field of this invention is data transmission in wireless telephony.

BACKGROUND OF THE INVENTION

FIG. 1 shows an exemplary wireless telecommunications network 100. The illustrative telecommunications network includes base stations 101, 102 and 103, though in operation, a telecommunications network necessarily includes many more base stations. Each of base stations 101, 102 and 103 are operable over corresponding coverage areas 104, 105 and 106. Each base station's coverage area is further divided into cells. In the illustrated network, each base station's coverage area is divided into three cells. Handset or other user equipment (UE) 109 is shown in Cell A 108. Cell A 108 is within coverage area 104 of base station 101. Base station 101 transmits to and receives transmissions from UE 109. As UE 109 moves out of Cell A 108 and into Cell B 107, UE 109 may be handed over to base station 102. Because UE 109 is synchronized with base station 101, UE 109 can employ non-synchronized random access to initiate handover to base station 102.

Non-synchronized UE 109 also employs non-synchronous random access to request allocation of up link 111 time or frequency or code resources. If UE 109 has data ready for transmission, which may be traffic data, measurements report, tracking area update, UE 109 can transmit a random access signal on up link 111. The random access signal notifies base station 101 that UE 109 requires up link resources to transmit the UEs data. Base station 101 responds by transmitting to UE 109 via down link 110, a message containing the parameters of the resources allocated for UE 109 up link transmission along with a possible timing error correction. After receiving the resource allocation and a possible timing advance message transmitted on down link 110 by base station 101, UE 109 optionally adjusts its transmit timing and transmits the data on up link 111 employing the allotted resources during the prescribed time interval.

SUMMARY OF THE INVENTION

This invention is a method and an apparatus for up link transmission of data from a user equipment to a base station for single user multiple input, multiple output. This invention includes receiving at least one codeword, permuting the received codewords, precoding the permuted codewords and transmitting the predecoded codewords on plural antennas. The codewords may be permuted by layer permutation or by codeword permutation.

BRIEF DESCRIPTION OF THE DRAWINGS

These and other aspects of this invention are illustrated in the drawings, in which.

DETAILED DESCRIPTION OF PREFERRED EMBODIMENTS

The current Evolved Universal Terrestrial Radio Access (E-UTRA) Long Term Evolution (LTE) Rel. 8 specification only supports single antenna transmission on the uplink (UL). All the signaling aspects are designed with this restriction in mind. As the enhancement for LTE is coming due to the IMT-Advanced call-of-proposal for yet another generation of upgrade in cellular technology, different aspects of LTE need to be reevaluated and improved. Of a particular interest is to increase the UL peak data rate by at least a factor of 2 and increase the UL spectral efficiency to meet the IMT-Advanced requirements. Since 64 Quadrature Amplitude Modulation (QAM) has already been supported for LTE Rel. 8, the support of UL Single-User Multiple Input, Multiple Output (SU-MIMO) including spatial multiplexing is inevitable.

Figure 1:
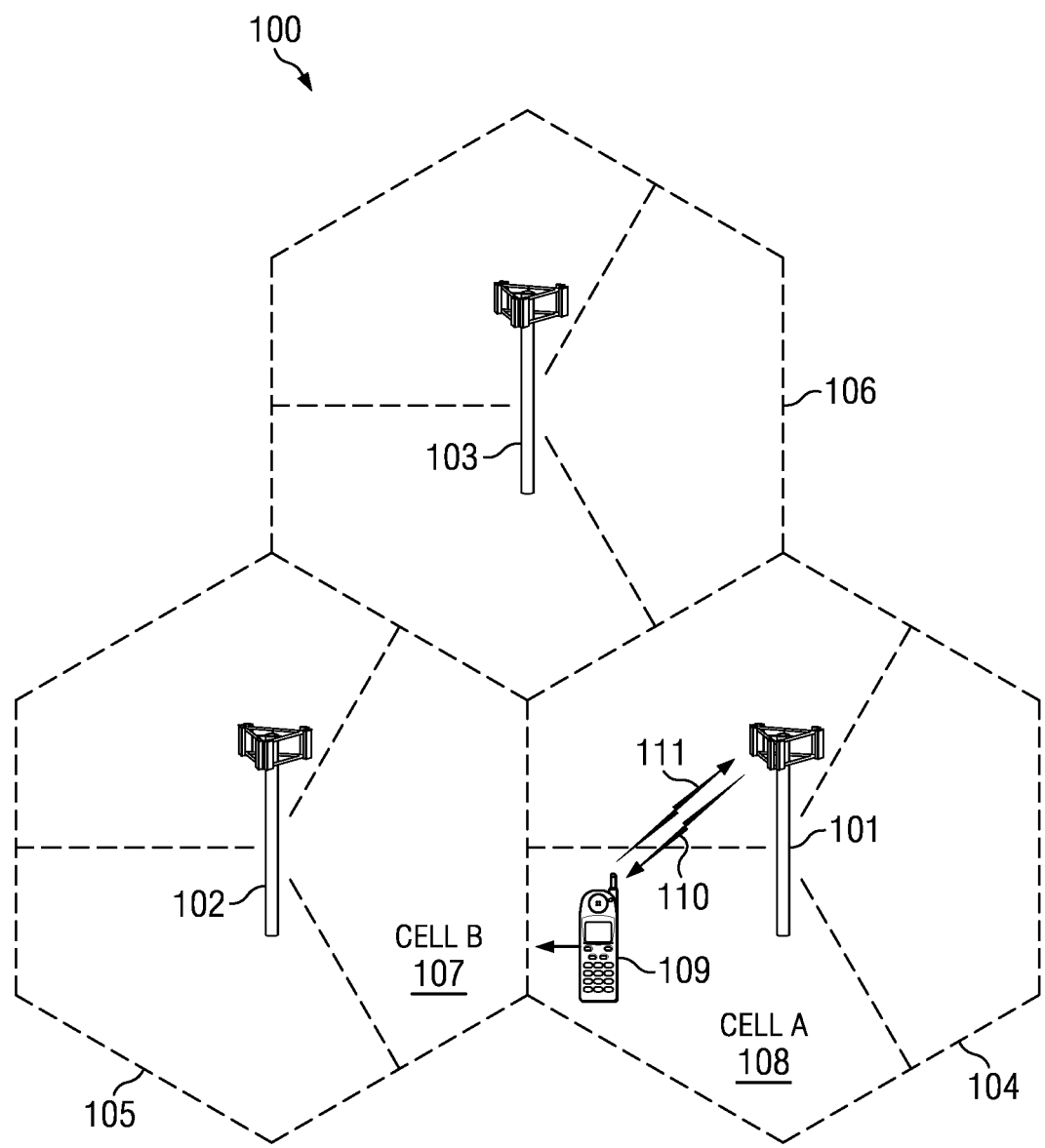
FIG. 1 is a diagram of a communication system of the prior art related to this invention having three cells.
Figure 2:
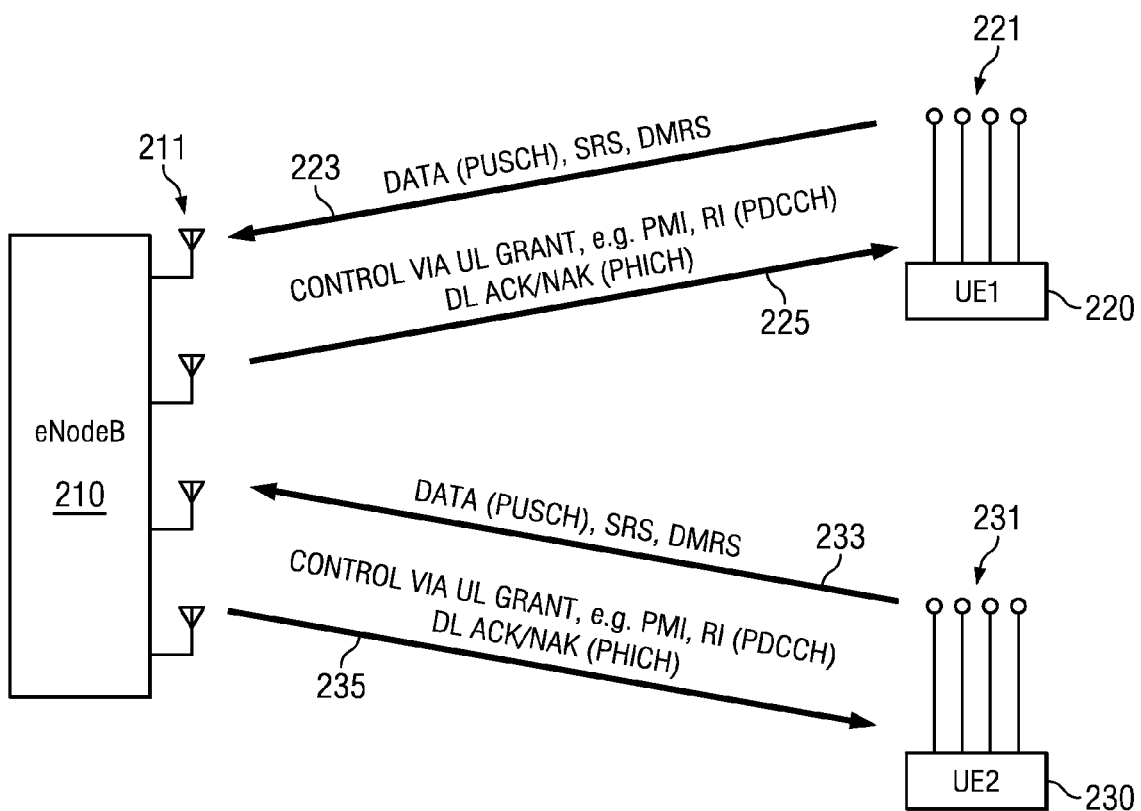
FIG. 2 illustrates a high-level description of the up link single user multiple input multiple output of this invention (prior art)

FIG. 2 illustrates a high-level description of UL SU-MIMO operation for LTE. Base station eNB 210 including plural antennas 211 communicates with both UE1 220 and UE2 230. UE1 220 includes antennas 221. UE2 230 includes antennas 231. eNB 210 communicates with UE1 220 including up link communication 223 and down link communications 225. eNB 210 communicates with UE1 230 including up link communication 233 and down link communications 235. Up link communications 223 and 233 include data on a Physical Uplink Shared CHannel (PUSCH), Sounding Reference Signals (SRS) and Demodulation Reference Signal Sequence (DMRS). Down link communications 225 and 235 include control via UL grant such as Precoding Matrix Indicator (PMI), Rank Indicator (RI) via Physical Downlink Control CHannel (PDCCH) and DL acknowledge (ACK)/not acknowledge (NAK) via Physical Hybrid Automatic Repeat Request (ARQ) Indicator CHannel (PHICH).

There are some challenges supporting UL SU-MIMO for LTE. This new technique needs to be backward compatible with LTE Rel. 8 and introduce minimum impact on the current LTE specification. This is particularly true for control signaling. This technique needs to support both 2 and 4 transmit antennas at the UE.

The codeword-to-layer mapping which includes the number of codewords for a given number of transmission layers is important. Keeping the impact on the specification to a minimum while maintaining competitive performance is desirable. Reusing the codeword-to-layer mapping for DL SU-MIMO is hence preferred. It is also desirable to minimize the DL control overhead, for example PHICH and UL grant.

Figure 3:
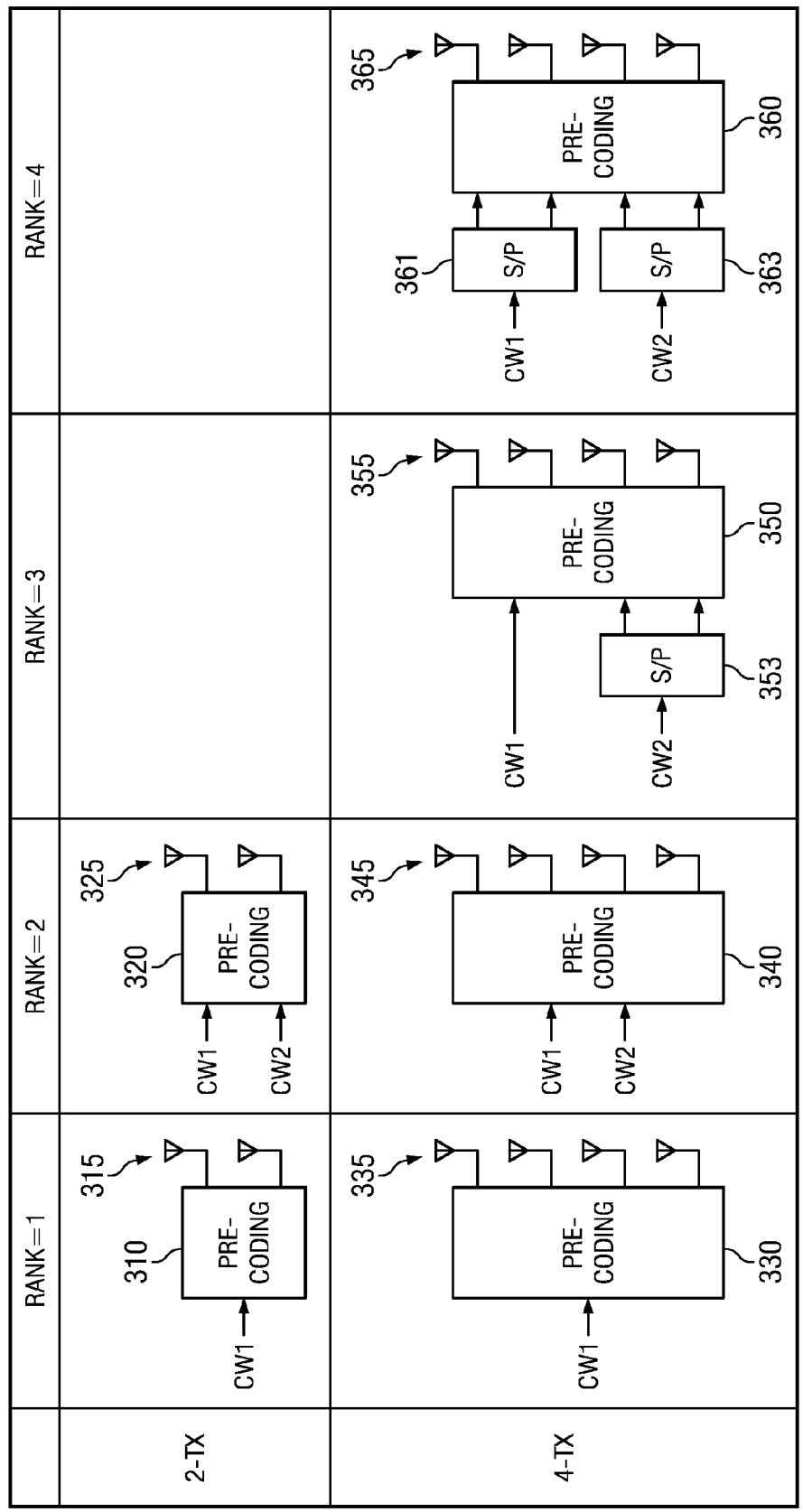
FIG. 3 illustrates a prior art codeword-to-layer mapping scheme for the up link single user multiple input multiple output of this invention.

FIG. 3 illustrates a prior art codeword-to-layer mapping scheme for the DL SU-MIMO. There are at most 2 codewords for a given number of layers. Each codeword is associated with a transport block (TB). There are at most 2 TBs for a given number of layers. This should be distinguished from a codeblock where one TB can be segmented into multiple codeblocks. Each TB is associated with one Hybrid Automatic Repeat Request (HARQ) process including the associated ACK/NAK, redundancy version (RV) and new data indicator (NDI) as well as one Modulation and Coding Scheme (MCS). Alternatively, in case of spatial multiplexing with 2 TBs, both TBs can be associated with the same HARQ process but with different ACK/NAK, RV, NDI and MCS.

FIG. 3 illustrates Rank 1 and Rank 2 cases for two transmit antennas and Rank 1, Rank 2, Rank 3 and Rank 4 for four transmit antennas. In the two transmit antenna, Rank 1 case codeword CW1 supplies predecoding 310 which connects to two transmit antennas 315. In the two transmit antenna, Rank 2 case codewords CW1 and CW2 supply predecoding 320 which connects to two transmit antennas 325. In the four transmit antenna, Rank 1 case codeword CW1 supplies predecoding 330 which connects to four transmit antennas 335. In the four transmit antenna, Rank 2 case codewords CW1 and CW2 supply predecoding 340 which connects to four transmit antennas 345. In the four transmit antenna, Rank 3 case codeword CW1 directly supplies predecoding 350 and codeword CW2 supplies predecoding 350 via two outputs of serial to parallel converter 353. Predecoding 350 connects to four transmit antennas 355. In the four transmit antenna, Rank 4 case codeword CW1 supplies serial to parallel converter 361 and codeword CW2 supplies serial to parallel converter 363. Serial to parallel converters 361 and 363 each supply two outputs to predecoding 360. Predecoding 360 connects to four transmit antennas 365.

Figure 4:
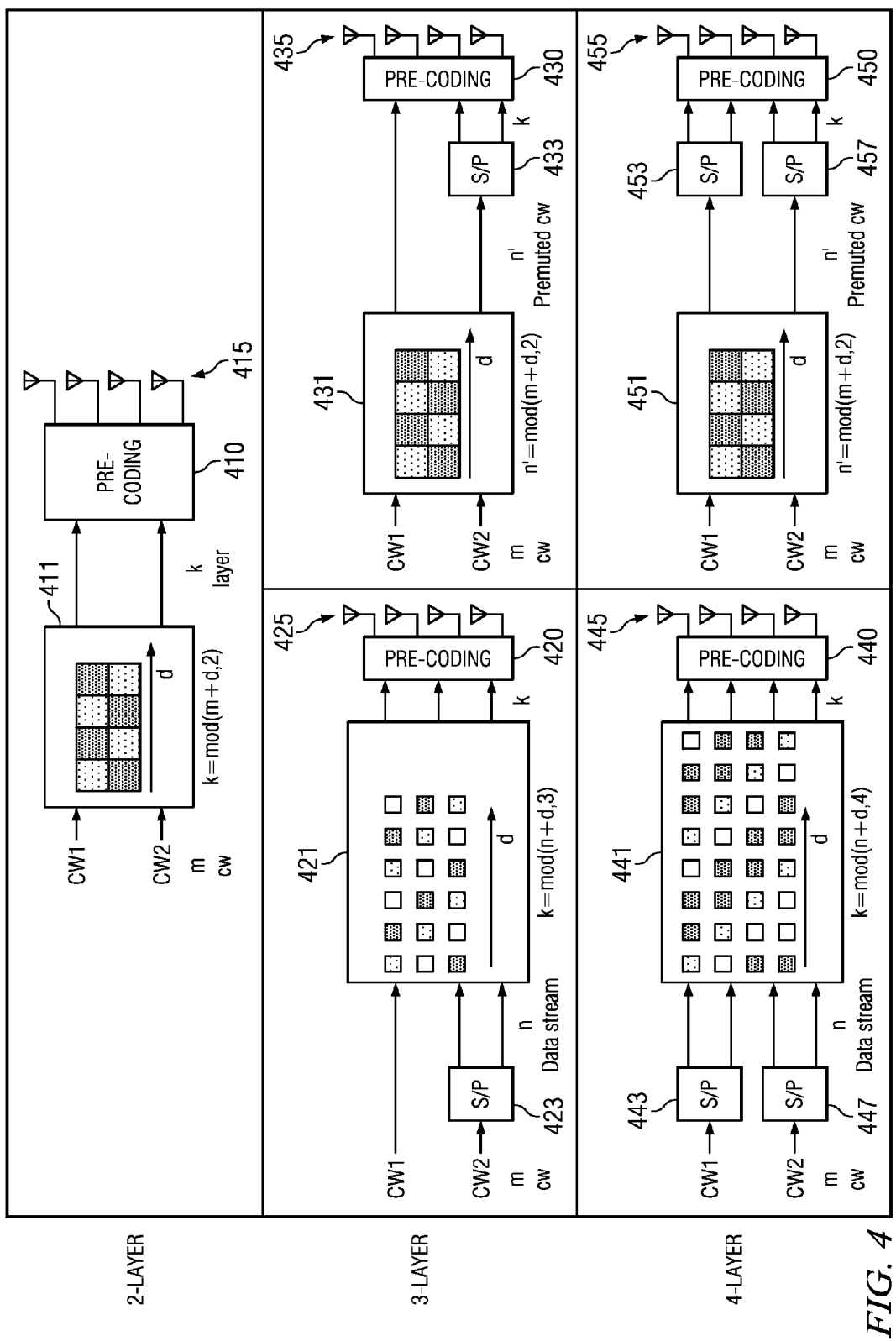
FIG. 4 illustrates some examples of layer/codeword diversity according to this invention.

FIG. 4 illustrates some examples of layer/codeword diversity according to this invention. FIG. 4 only illustrates examples for the four transmit antenna case. This is illustrative only. Embodiments for the two transmit antenna case are simple to deduce from these examples. FIG. 4 illustrates illustrative permutation patterns only. Other permutation patterns are also feasible.

FIG. 4 illustrates 2 layer, 3 layer and 4 layer exampled for four transmit antennas. In the 2 layer case, codewords CW1 and CW2 supply permuter 411. Permuter 411 performs the function k=mod(m+d,2) in supplying two outputs to predecoding 410 which connects to four transmit antennas 415. In a 3 layer, layer permutation case, codeword CW1 supplies one signal to permuter 421. Codeword CW2 supplies serial to parallel converter 423 which supplies two signals to permuter 421. Permuter 421 performs the function k=mod(n+d,3) in supplying three signals to predecoding 420 which connects to four transmit antennas 425. In a an alternative 3 layer, codeword permutation case, codewords CW1 and CW2 each supply one signal to permuter 431. Permuter 431 performs the function n'=mod(m+d,2) in generating two outputs. Permuter 431 supplies one signal directly to predecoding 430 and one signal to serial to parallel converter 433 which supplies two signals to predecoding 430. Predecoding 430 connects to four transmit antennas 435. In a 4 layer, layer permutation case, codeword CW1 supplies serial to parallel converter 443 which supplies two signals to permuter 441. Codeword CW2 supplies serial to parallel converter 443 which supplies two signals to permuter 441. Permuter 441 performs the function k=mod(n+d,4) in generating four outputs. Permuter 441 supplies four signals to predecoding 440 which connects to four transmit antennas 445. In a an alternative layer, codeword permutation case, codewords CW1 and CW2 each supply one signal to permuter 451. Permuter 451 performs the function n'=mod(m+d,2) in generating two outputs. Permuter 451 supplies one signal to serial to parallel converter 453 and one signal to serial to parallel converter 433. Serial to parallel converters 453 and 457 each supply two signals to predecoding 450. Predecoding 450 connects to four transmit antennas 455. Note in FIG. 4: m is an index of input code words; k is an index of inputs to the predecoding; n is an index of intermediate signals before permutation; and n' is an index of intermediate signals after permutation.

This invention aims to minimize the control overhead while keeping the same codeword-to-layer mapping scheme for UL SU-MIMO. This invention uses the same codeword-to-layer mapping as depicted in FIG. 3. Thus there is a maximum of 2 codewords and each codeword is associated with one transport block. This invention also includes some layer or codeword diversity scheme. The layer diversity can be introduced in frequency domain across sub-carriers or resource elements or time domain across Discrete Fourier Transform Spread (DFTS) Orthogonal Frequency Division Multiplexing (OFDM) symbols. The permutation domain is indexed by d in FIG. 4. Introducing layer diversity amounts to equalizing the Signal to Interference plus Noise Ratio (SINR) across codewords when a linear/one-shot MIMO receiver is used such as LMMSE.

Large delay Cyclic Delay Diversity (CDD) could be used for LTE DL SU-MIMO. Such a large delay CDD tends to increase the Peak-to-Average Power Ratio (PAPR)/CM due to the Discrete Fourier Transform (DFT) precoding unless a fixed DFT precoding is used.

Simple layer permutation could be used in which each of the data streams at the output of a serial to parallel converter is spread across all layers/virtual antennas. This introduces spatial diversity within each of the data streams.

Codeword permutation spreads each of the data streams across all the layers, thus the two codewords are permuted. Since a codeword is mapped onto one or two layers, this also results in spreading of each data stream across layers. Note that codeword permutation is identical to layer permutation for 1-layer and 2-layer transmission since 1 codeword is associated only with 1 layer.

Other variations of FIG. 4 and permutation patterns are possible. For codeword permutation, it is possible to perform another permutation after the serial to parallel conversion. For example, in 4 layer mapping the carrier 1 is layer permutation is (1, 2, 3, 4) and the carrier 2 layer permutation is (4, 3, 2, 1). For 3 layer mapping the carrier 1 layer permutation is (1, 2, 3,) and the carrier 2 layer permutation is (3, 2, 1).

DL ACK/NAK bundling across codewords known as spatial bundling avoids increasing PHICH overhead. In the case, both codewords and thus the TBs share the same DL ACK/NAK. Only a 1-bit DL ACK/NAK is used regardless of the number of codewords or layers.

There are 4 possibilities in regard of the combination of NDI, RV and Transport Block Size (TBS). The RV is jointly encoded with MCS in the UL grant in a technique known as MCS-RV field. The TBS is derived from MCS and resource allocation field which is the number of assigned resource blocks (RBs).

In a first alternative, there is one distinct set (NDI, RV, TBS) per codeword. Thus a TB has 2 NDI and 2 MCS-RV. This alternative provides the maximum flexibility.

In a second alternative, there is one distinct NDI per codeword/TB and a single set (RV, TBS) shared by all codeword(s). Thus each TB has 2 NDI and 1 MCS-RV. If the SINR for the two codewords are similar such as with LMMSE receiver, this second alternative may offer comparable performance to the first alternative if both codewords correspond to new transmission. If one of the codewords is an adaptive retransmission, then some performance degradation may occur with this second alternative relative to the first alternative. The second alternative may encounter some scheduler restrictions. For example for the adaptive retransmission codeword, the TB size shall be the same as the initial transmission of the same TB, the MCS combined with resource allocation determines the modulation order, coding rate and RV. The MCS and resource allocation also determines the TB size and modulation order for the new transmission on the other codeword. If one codeword is for new transmission and the other codeword is for adaptive retransmission, MCS from 29 to 31 may not be used for the retransmission codeword, because MCS from 29 to 31 is not meaningful to a new transmission codeword. Having a single MCS does not allow the system to reap maximum benefit with SIC receiver.

In a third alternative, a single NDI is shared by all codewords and TBs, and a single set (RV, TBS) is shared by all codewords. Thus each TB has one NDI and one MCS-RV. This third alternative is the most economical solution and has comparable performance to the second alternative. In this alternative, the RV corresponding to both TBs may be made the same but this is not required.

In a fourth alternative, a single NDI is shared by all codewords and TBs, and one distinct set (RV, TBS) is shared per codeword. Thus each TB has 1 NDI and 2 MCS-RV. In this fourth alternative, the RV corresponding to both TBs may be made the same while the MCS corresponding to the 2 TBs can be different but this is not required. This fourth alternative is consistent with DL ACK/NAK spatial bundling. Having different MCS fields for the 2 TBs allows the system to exploit the SINR gain in the second TB when SIC receiver is used. The gain of SIC receiver is more significant in the first transmission. Differential MCS can be used for the second codeword relative to the MCS of the first codeword to reduce the overhead corresponding to the second MCS. The differential MCS corresponding to the second TB is indicated by less than 5 bits such as 3 bits while the MCS associated with the first TB is indicated by 5 bits. The differential MCS is defined only relative to the MCS values of 0 to 28. If a single NDI is used, a single HARQ process may be defined for both codewords and TBs. This is possible whether the two TBs share the same MCS field or not.

What is claimed is:

1. A method of up link transmission of data from a user equipment to a base station for single user multiple input, multiple output, comprising the steps of:
   receiving two codewords;
   permuting the two received codewords employing the function k=mod(m+d,2) producing two outputs where: k is a layer index, m is a codeword index, and d is a permutation domain index;
   precoding the permuted two received codewords; and
   transmitting on plural antennas the precoded, permuted two received codewords.

2. The method of claim 1, wherein:
   said step of permuting includes layer permutation.

3. The method of claim 1, wherein:
   said step of permuting includes codeword permutation.

4. A method of up link transmission of data from a user equipment to a base station for single user multiple input, multiple output, comprising the steps of:
   receiving two codewords and splitting one received codeword via a serial to parallel converter;
   permuting the two received codewords employing the function k=mod(n+d,3) producing three outputs where: k is a layer index, n is an index of input to the permuter, and d is a permutation domain index;
   precoding the three outputs; and
   transmitting on plural antennas the precoded, permuted two received codewords.

5. A method of up link transmission of data from a user equipment to a base station for single user multiple input, multiple output, comprising the steps of:
   receiving two codewords;
   permuting the two received codewords employing the function n'=mod(m+d,2) producing two outputs where: n' is an index of the permuter output, m is a codeword index, and d is a permutation domain index;
   splitting one permuter output via a serial to parallel converter;
   precoding the three outputs; and
   transmitting on plural antennas the precoded, permuted two received codewords.

6. A method of up link transmission of data from a user equipment to a base station for single user multiple input, multiple output, comprising the steps of:
   receiving two codewords and splitting each received codeword via a corresponding serial to parallel converter;
   permuting the two received codewords employing the function k=mod(n+d,4) producing four outputs where: k is a layer index, n is an index of the permuter input, and d is a permutation domain index;
   precoding the four outputs; and
   transmitting on plural antennas the precoded, permuted two received codewords.

7. A method of up link transmission of data from a user equipment to a base station for single user multiple input, multiple output, comprising the steps of:
   receiving two codewords;
   permuting the two received codewords employing the function n'=mod(m+d,2) producing two outputs where: n' is an index of the permuter output, m is a codeword index, and d is a permutation domain index;
   splitting each permuter output via a corresponding serial to parallel converter;
   precoding the four outputs; and
   transmitting on plural antennas the precoded, permuted two received codewords.

8. A user equipment for single user multiple input, multiple output transmission to a base station, comprising:
   a permuter receiving two codewords and permuting said two received codewords employing the function k=mod(m+d,2) producing two outputs where: k is a layer index, m is a codeword index, and d is a permutation domain index;
   a precoder connected to said permuter precoding the permuted two received codewords; and
   plural antennas connected to said precoder for transmitting the precoded, permuted two received codewords.

9. A user equipment for single user multiple input, multiple output transmission to a base station comprising:
   a serial to parallel converter splitting one received codeword into two signals;
   a permuter directly receiving a first codeword and receiving a second codeword split into two signals by said parallel to serial converter, said permuter permuting three inputs employing the function k=mod(n+d,3) producing three outputs where: k is a layer index, n is an index of input to the permuter, and d is a permutation domain index;
   a precoder connected to said permuter precoding the permuted three received codewords; and
   plural antennas connected to said precoder for transmitting the precoded, permuted two received codewords.

10. A user equipment for single user multiple input, multiple output transmission to a base station comprising:
    a permuter receiving two codewords, said permuter permuting said codewords employing the function n'=mod (m+d,2) producing two outputs where: n' is an index of the permuter output, m is a codeword index, and d is a permutation domain index;

a serial to parallel converter receiving one permuter output and splitting said one permuter output into two signals;

a precoder connected to said permuter precoding the three outputs; and plural antennas connected to said precoder for transmitting the precoded, permuted two received codewords.

11. A user equipment for single user multiple input, multiple output transmission to a base station comprising:

a first serial to parallel converter splitting a first codeword into two signals;

a second serial to parallel converter splitting a second codeword into two signals;

a permuter connected to said first and said second serial to parallel converters receiving said first and second codewords as split by said corresponding serial to parallel converters, said permuter permuting said first and second codewords employing the function k=mod(n+d,4) producing four outputs where: k is a layer index, n is an index of the permuter input, and d is a permutation domain index; and a precoder connected to said permuter precoding the permuted four outputs; and plural antennas connected to said precoder for transmitting the precoded, permuted two received codewords.

12. A user equipment for single user multiple input, multiple output transmission to a base station comprising:

a permuter receiving first and second codewords, said permuter permuting said first and said second codewords employing the function n'=mod(m+d,2) producing two outputs where: n' is an index of the permuter output, in is a codeword index, and d is a permutation domain index;

a first serial to parallel converter splitting a first output of said permuter into two signals;

a second serial to parallel converter splitting a second output of said permuter into two signals;

a precoder connected to said permuter precoding the four outputs; and plural antennas connected to said first and second serial to parallel converters for transmitting the precoded, permuted two received codewords.

* * * * *